(12) United States Patent
King et al.

(10) Patent No.: US 11,811,036 B1
(45) Date of Patent: Nov. 7, 2023

(54) APPARATUS AND METHOD FOR FAULT DETECTION IN A BATTERY MODULE

(71) Applicant: BETA AIR, LLC, South Burlington, VT (US)

(72) Inventors: Grayson King, South Burlington, VT (US); Cullen Jemison, South Burlington, VT (US); Miles Tallada, South Burlington, VT (US); Stuart Schreiber, South Burlington, VT (US)

(73) Assignee: BETA AIR, LLC, South Burlington, VT (US)

( * ) Notice: Subject to any disclaimer, the term of this patent is extended or adjusted under 35 U.S.C. 154(b) by 0 days.

(21) Appl. No.: 17/966,632

(22) Filed: Oct. 14, 2022

(51) Int. Cl.
 *H01M 10/613* (2014.01)
 *H01M 10/42* (2006.01)
 *H01M 10/48* (2006.01)
 *H01M 10/6555* (2014.01)
 *H01M 10/658* (2014.01)
 *H01M 10/6557* (2014.01)

(52) U.S. Cl.
 CPC ....... *H01M 10/613* (2015.04); *H01M 10/425* (2013.01); *H01M 10/482* (2013.01); *H01M 10/658* (2015.04); *H01M 10/6555* (2015.04); *H01M 10/6557* (2015.04); *H01M 2010/4271* (2013.01)

(58) Field of Classification Search
 CPC ........... H01M 10/613; H01M 10/6555; H01M 10/6557; H01M 10/658; H01M 10/425; H01M 10/482
 See application file for complete search history.

(56) References Cited

U.S. PATENT DOCUMENTS

| 11,289,741 | B2 | 3/2022 | Hinterberger | |
| 2010/0151308 | A1* | 6/2010 | Hermann | H01M 50/209 |
| | | | | 429/120 |
| 2021/0111439 | A1* | 4/2021 | Moen | H01M 10/486 |
| 2021/0399357 | A1 | 12/2021 | Choi | |

FOREIGN PATENT DOCUMENTS

| CN | 1239335 A | * 12/1999 | ......... G01R 31/3624 |
| CN | 112993440 A | 6/2021 | |
| DE | 102019202403 A1 | 8/2020 | |

OTHER PUBLICATIONS

Associated Power Technologies, "To Float or Not to Float? Analysis of a floating vs. grounded output", Published Oct. 2020.*

* cited by examiner

*Primary Examiner* — Jimmy Vo
(74) *Attorney, Agent, or Firm* — CALDWELL INTELLECTUAL PROPERTY LAW

(57) ABSTRACT

A apparatus for fault detection for use in an electric aircraft is disclosed herein. The apparatus includes a battery module with a plurality of battery cells, a plate extending along the row of cells, insulation between the plate and the plurality of cells, a sensor configured to detect a potential signal, and a controller communicatively connected to the sensor. The controller is configured to receive the potential signal and determine a fault.

20 Claims, 10 Drawing Sheets

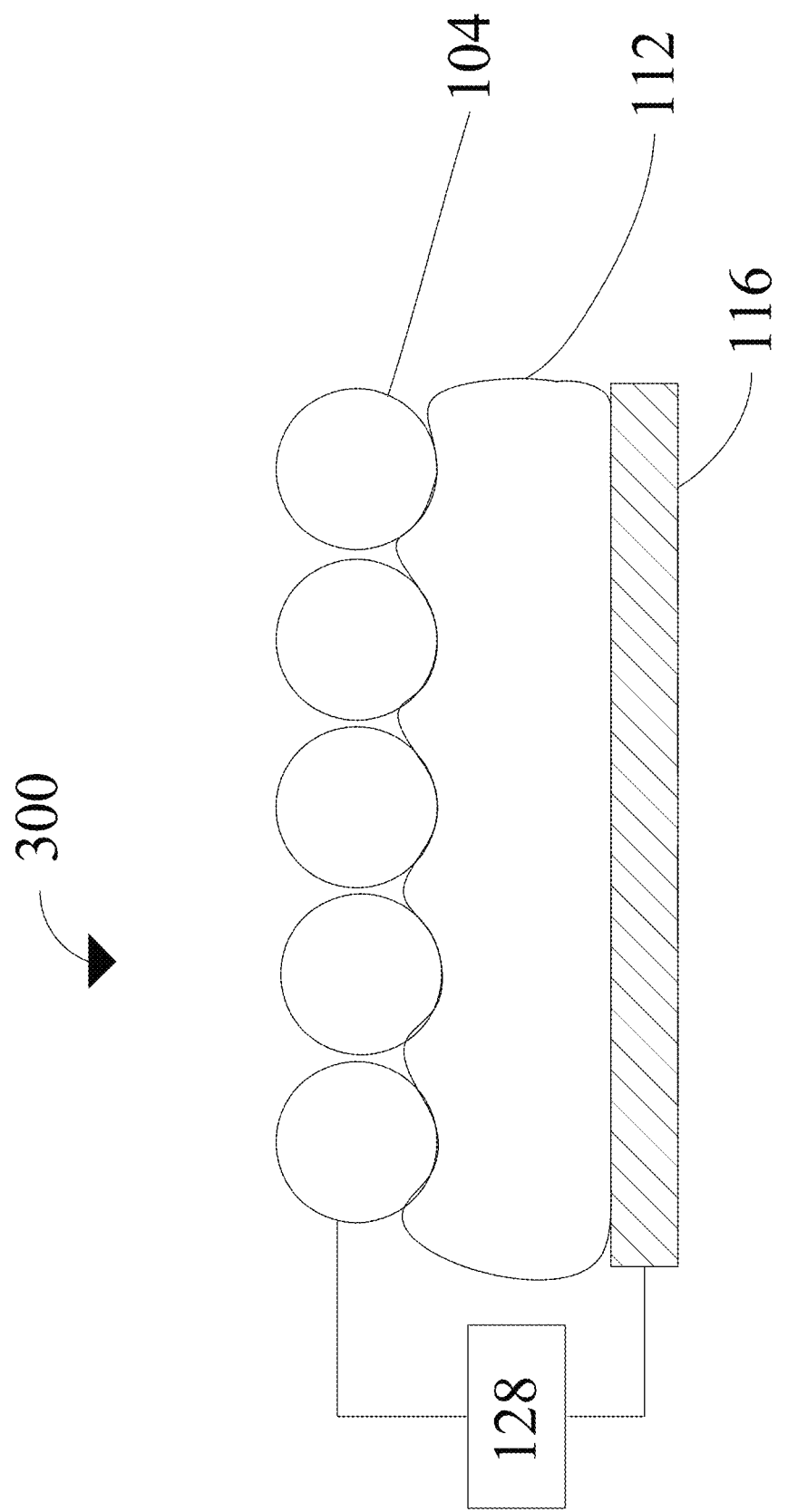

APPARATUS AND METHOD FOR FAULT DETECTION IN A BATTERY MODULE

FIELD OF THE INVENTION

The present invention generally relates to the field of electric aircraft. In particular, the present invention is directed to for fault detection in a battery module BACKGROUND In some circumstances, a battery cell may short-circuit causing the cell to rupture. This cell rupture may cause a rapid rise in temperature that causes ruptures in adjacent cells, commonly referred as thermal runaway, that may damage the battery and any other parts in close proximity to the battery. In an electric aircraft, a thermal runaway may be fatal to the pilot and anyone inside as the aircraft may lose function mid-air. There is a need for a fault detection apparatus to alert pilots of faults within battery modules.

SUMMARY OF THE DISCLOSURE

In an aspect, an apparatus for fault detection in a battery module includes a battery module with a plurality of battery cells, a plate extending along the battery cells, an insulation disposed between the plurality of battery cells and the plate, wherein the insulation is configured to electrically insulate the plate from the plurality of battery cells, a sensor configured to detect a potential signal as a function of a potential between the plate and a reference potential, and a controller communicatively connected to the sensor, wherein the controller configured to: receive the potential signal from the sensor, and determine a fault as a function of the potential signal.

In another aspect, a method of fault detection in a battery module includes disposing an insulation between a plurality of battery cells of a battery module and a plate, wherein the insulation is configured to electrically insulate the plate from the plurality of battery cells, detecting, by a sensor, a potential signal as a function of a potential between the plate and a reference potential, receiving, by a controller, the potential signal from the sensor, and determining, by the controller, a fault as a function of the potential signal.

This and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein:

FIG. 3 is a schematic of a fault detection apparatus with floating ground;

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to a apparatus for fault detection in a battery module. A battery module may include a plurality of battery cells and a plurality of cooling plates that may act as a heat exchanger. Plates may be used to detect faults in the apparatus. In an embodiment, plates may act as a floating ground to determine a local fault. In another embodiment, plates may be connected to the aircraft's ground to determine a global fault. Exemplary embodiments illustrating aspects of the present disclosure are described below in the context of several specific examples.

Figure 1:
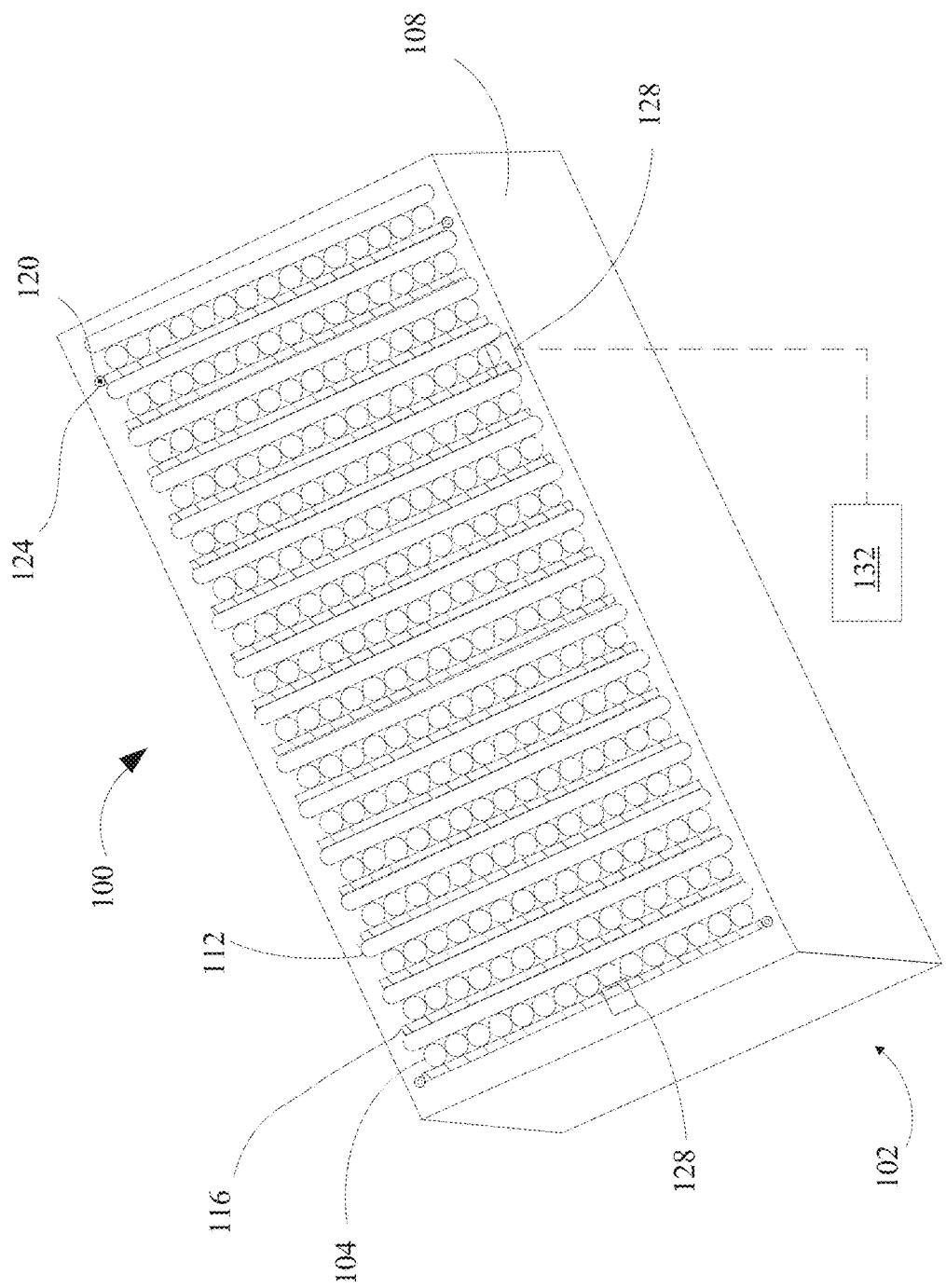
FIG. 1 is an exemplary representation of a fault detection apparatus for use in an electric aircraft.

Referring now to the drawings, FIG. 1 illustrates an apparatus 100 for fault detection in a battery module. Apparatus 100 includes a battery module 102. The battery module 102 illustrated is merely exemplary and should not be considered limiting in any way. Battery module 102 is configured to control the dissipation of heat within a battery module as to prevent, or at least reduce the likelihood, of a thermal runaway. In some embodiments, battery module 102 may include a plurality of pouch cells. A "pouch cell", as used in this disclosure, is a battery cell that includes a pouch. Pouch cells may be consistent with any pouch cell as described in Non-provisional application Ser. No. 17/348,960 filed on Jun. 16, 2020 and entitled "BATTERY PACK FOR ELECTRIC VERTICAL TAKE-OFF AND LANDING AIRCRAFT," incorporated herein by reference in its entirety.

Still referring to FIG. 1, battery module 102 is designed and configured to include a plurality of battery cells 104. A "battery cell," as used in this disclosure, is an electrochemical element that holds an electric potential. The battery cells 104 may utilize electrochemical cells, galvanic cells, electrolytic cells, fuel cells, flow cells, and/or voltaic cells. In general, an electrochemical cell is a device capable of generating electrical energy from chemical reactions or using electrical energy to cause chemical reactions, this disclosure will focus on the former. Voltaic or galvanic cells are electrochemical cells that generate electric current from chemical reactions, while electrolytic cells generate chemical reactions via electrolysis. In general, the term 'battery' is used as a collection of cells connected in series or parallel to each other. A battery cell may, when used in conjunction with other cells, may be electrically connected in series, in parallel or a combination of series and parallel. Series connection includes wiring a first terminal of a first cell to a second terminal of a second cell and further configured to include a single conductive path for electricity to flow while maintaining the same current (measured in Amperes)

through any component in the circuit. A battery cell may use the term 'wired', but one of ordinary skill in the art would appreciate that this term is synonymous with 'electrically connected', and that there are many ways to couple electrical elements like battery cells together. An example of a connector that does not include wires may be prefabricated terminals of a first gender that mate with a second terminal with a second gender. Battery cells may be wired in parallel. Parallel connection includes wiring a first and second terminal of a first battery cell to a first and second terminal of a second battery cell and further configured to include more than one conductive path for electricity to flow while maintaining the same voltage (measured in Volts) across any component in the circuit. Battery cells may be wired in a series-parallel circuit which combines characteristics of the constituent circuit types to this combination circuit. Battery cells may be electrically connected in a virtually unlimited arrangement which may confer onto the apparatus the electrical advantages associated with that arrangement such as high-voltage applications, high-current applications, or the like. In an exemplary embodiment, battery module 102 include 196 battery cells in series and 18 battery cells in parallel. This is, as someone of ordinary skill in the art would appreciate, is only an example and battery module 102 may be configured to have a near limitless arrangement of battery cell configurations. Battery module 102 may include any embodiment defined in Non-provisional application Ser. No. 17/008,721 filed on Sep. 1, 2020 and entitled "SYSTEM AND METHOD FOR SECURING BATTERY IN AIRCRAFT," and Non-provisional application Ser. No. 16/948,141 filed on Sep. 4, 2020 and entitled "COOLING ASSEMBLY FOR USE IN A BATTERY MODULE ASSEMBLY," both incorporated herein by reference in its entirety.

With continued reference to FIG. 1, the battery module 102 may also include an end panel including a plurality of electrical connectors and further configured to fix the battery module 102 in alignment with at least the side wall. The end panel may include a plurality of electrical connectors of a first gender configured to electrically and mechanically couple to electrical connectors of a second gender. The end panel may be configured to convey electrical energy from battery cells to at least a portion of an eVTOL aircraft. Electrical energy may be configured to power at least a portion of an eVTOL aircraft or include signals to notify aircraft computers, personnel, users, pilots, and any others of information regarding battery health, emergencies, and/or electrical characteristics. The plurality of electrical connectors may include blind mate connectors, plug and socket connectors, screw terminals, ring and spade connectors, blade connectors, and/or an undisclosed type alone or in combination. The electrical connectors of which the end panel includes may be configured for power and communication purposes. A first end of the end panel may be configured to mechanically couple to a first end of a first side wall by a snap attachment mechanism, similar to end cap and side panel configuration utilized in the battery module. To reiterate, a protrusion disposed in or on the end panel may be captured, at least in part, by a receptacle disposed in or on the side wall. A second end of end the panel may be mechanically coupled to a second end of a second side wall in a similar or the same mechanism.

With continued reference to FIG. 1, any of the disclosed components or apparatuses, namely battery module 102, and/or battery cells 104 may incorporate provisions to dissipate heat energy present due to electrical resistance in integral circuit. Battery module 102 includes one or more battery cells 104 wired in series and/or parallel. The presence of a voltage difference and associated amperage inevitably will increase heat energy present in and around battery module 102. The presence of heat energy in a power system is potentially dangerous because it can introduce energy possibly sufficient to damage mechanical, electrical, and/or other systems present in at least a portion of exemplary electric aircraft. Battery module 102 may include mechanical design elements that may thermodynamically dissipate heat energy away from battery module 102. The mechanical design may include, but is not limited to, slots, fins, heat sinks, perforations, a combination thereof, or another undisclosed element.

Still referencing FIG. 1, heat dissipation may include material selection beneficial to move heat energy in a suitable manner for operation of battery module 102. Certain materials with specific atomic structures and therefore specific elemental or alloyed properties and characteristics may be selected in construction of battery module 102 to transfer heat energy out of a vulnerable location or selected to withstand certain levels of heat energy output that may potentially damage an otherwise unprotected component. Material selection may include titanium, steel alloys, nickel, copper, nickel-copper alloys such as Monel, tantalum and tantalum alloys, tungsten and tungsten alloys such as Inconel, a combination thereof, or another undisclosed material or combination thereof. Heat dissipation may include a combination of mechanical design and material selection. The responsibility of heat dissipation may fall upon the material selection and design as disclosed herein in regard to any component disclosed in this paper.

According to embodiments, the circuitry disposed within or on battery module 102 may be shielded from electromagnetic interference. The battery elements and associated circuitry may be shielded by material such as mylar, aluminum, copper a combination thereof, or another suitable material. The battery module 102 and associated circuitry may include one or more of the aforementioned materials in their inherent construction or additionally added after manufacture for the express purpose of shielding a vulnerable component. The battery module 102 and associated circuitry may alternatively or additionally be shielded by location. Electrochemical interference shielding by location includes a design configured to separate a potentially vulnerable component from energy that may compromise the function of said component. The location of vulnerable component may be a physical uninterrupted distance away from an interfering energy source, or location configured to include a shielding element between energy source and target component. The shielding may include an aforementioned material in this section, a mechanical design configured to dissipate the interfering energy, and/or a combination thereof. The shielding comprising material, location and additional shielding elements may defend a vulnerable component from one or more types of energy at a single time and instance or include separate shielding for individual potentially interfering energies. In some embodiments the battery module 102 may be made of metal. In some embodiments the battery module 102 is made of aluminum. In some embodiments, the battery module 102 is made of 1000 series aluminum.

Alternatively, or additionally, and still referring to FIG. 1, the battery module 102 may further include a bottom side. In embodiments, the battery module 102 may include a top part that function as a lid. In one embodiment, the top side may be coated in flame retardant paint. In embodiments, the top side may include a flame retardant Polyurethane Foam.

In some embodiments, the battery module 102 may include a first vent hole in one of the sides, and second vent hole on the side opposite to the side with the first vent hole. In on embodiment, the outside of the vent holes may include thermally conductive material that allows for cooling of the battery module as a function of the aircraft's movements while preventing debris from entering the battery module through the vent hole. In a nonlimiting example, colder air from outside the aircraft may enter the module and thermally conductive material may allow for the colder temperature to spread throughout the battery module as to cool reduce the internal temperature of the module. In some embodiments, the bottom side may be coated with intumescent paint. In one embodiment top side may be coated with intumescent paint. In some embodiments an outside of battery module may be coated with intumescent paint. In one embodiment, an underside of top side may be coated with intumescent paint.

Continuing to refer to FIG. 1, the battery module 102 may include four sides 108, where two of the sides 108 are angled inward as to secure the plurality of battery cells 104 within the battery module 102. In a nonlimiting example, the sides are designed in a way where once the cells, plates, and insulation are placed in the module, a human interaction is needed for the contents to move outwards from the module.

Still referring to FIG. 1, the battery module 102 may include four sides 108 coated in flame retardant paint. In one embodiment, the flame retardant paint may be an intumescent paint. In some embodiments, the battery module 102 may further include a plurality of compression pads paced between the battery cells 104. "Compression pads", as used in this disclosure, are compressible foam cushions that may be placed next to battery cells 104 or a battery pouch and are configured to provide mechanical support while protecting the battery cells 104 against forces such as shock, vibration, and thermal runaway. Common nonlimiting examples of a compression pad may include the PORON® Microcellular Urethane and the BISCO silicone anti-vibration pads, both made by Rogers Corp., Chandler, Ariz.

Additionally, or alternatively, and still referring to FIG. 1, the battery module 102 may further include insulation 112 As used herein, "insulation" is material that provides thermal control. The insulation 112 may be made of any material suitable for battery insulation, such as the 3M Thermal Runaway Barrier Materials, built by 3M Corp., Saint Paul, Minn. In one embodiment, the insulation may include aerogel. In a nonlimiting example, the insulation 112 may contain a soft gel that allows the sleeve to shape around one side of the battery cells. In another nonlimiting example, insulation 112 may include a polymer, ceramic, fiber glass, cellulose, mineral wood, and the like. In another embodiment, insulation 112 may be a coating.

Alternatively, or additionally, and continuing to refer to FIG. 1, battery module 102 may further include a plurality of plates 116, each plate 116 disposed between a row of battery cells 104 and an insulation 112. Each plate 116 may include a first side configured to be in contact with at least a portion of a row of battery cells 104, and a second side coated with flame retardant paint, where the second side may be configured to be in contact with at least a portion of an insulation 112. Plate 116 may be a cooling plate, or other metal plates such as the plates on the case of the battery pack, other electrically isolated conductors, and the like. Plate 116 may be any metal plate isolated from the battery cells 104. In one embodiment, the battery module 102 may include a plurality of compression pads placed between the plurality plates 116 and the plurality of battery cells 104. In an embodiment, the battery module may include plates that contain wedges, where the wedges are configured to attach to at least a portion of at least a battery cell as to keep the battery cells in place. In an embodiment, the battery module 102 may include curved plates, where each curve in the plate is configured to attach to at least a portion a battery cell. In a nonlimiting example, the combination of the flame retardant coating and the insulating sleeve may help isolate the extreme temperature rise to a row of cells, or at least to a battery module so the pilot may have time to land the electric aircraft.

Still referencing FIG. 1, plates 116 may be used as a heat exchanger. Plate 116 may be a cooling plate. As used herein, a "cooling plate" is a component configured to transfer heat to or from the battery cells. In some cases, plates 116 may be configured to transfer heat to or from a fluid, such as a coolant. Plate 116 may include a coolant tube. A "coolant tube," for the purposes of this disclosure, is a tube that contains a coolant. In some cases, coolant tube may be configured to contain a flow of coolant. Coolant may include a compressible fluid (e.g., air) and/or an incompressible fluid (e.g., ethylene glycol, water, and the like). The cooling tube may be configured to include a smooth surface on the interior surface of the hollow tube. Alternatively, or additionally, cooling tube may further include at least a cooling fin on the interior surface of the tube. Coolant tube may be used to transfer heat away from the battery cells 104, by way of conduction. Alternatively, or additionally plate 116 may include a heat pipe. As used herein, a "heat pipe" is a heat-transfer device that employs phase transition to transfer heat between two solid interfaces. Heat pipe may include a phase change material hermetically sealed within the heat pipe. Phase change material may include water, R134a, ammonia, cesium, potassium, sodium, nitrogen, and the like. In some embodiments, heat pope may transfer heat from the battery cells 104 through latent heat of the phase change material. Heat pipe, coolant tube, and/or cooling plates may be composed of a thermally conductive material such as copper, aluminum, carbon steel, titanium, aluminum, steel, carbon steel, and the like. Alternatively, or additionally, in some cases, cooling plates 116 may be configured to flow compressed air into and/or through the battery module 102/battery cells 104. The flow of compressed air may cool/heat the battery cells 104/battery module 102 through convection.

Figure 4:
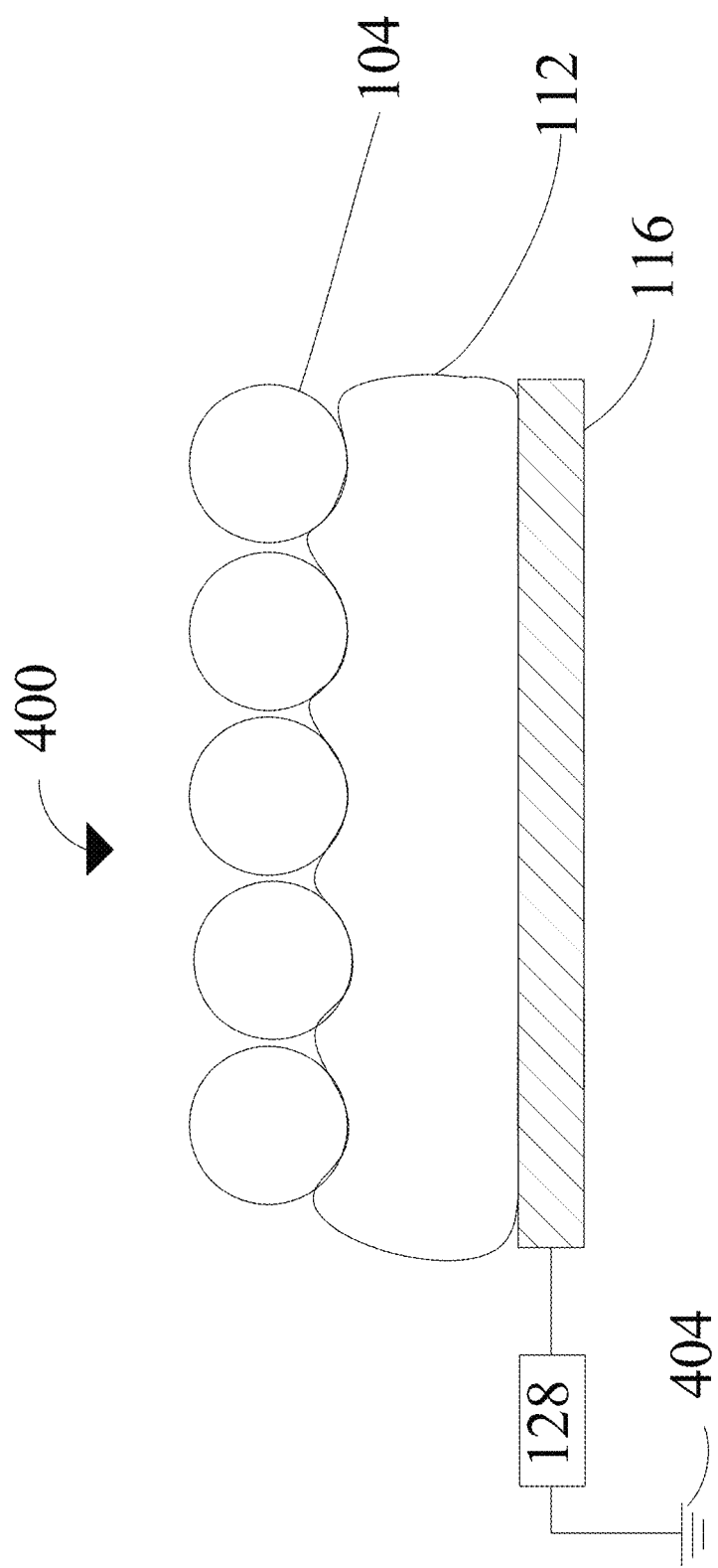
FIG. 4 is a schematic of a fault detection apparatus with a plate grounded to the aircraft ground.

Continuing to reference FIG. 1, plate 116 may be grounded to a reference potential. As used herein, a "reference potential" is an electrode wherein potential/voltage is measured from. In some embodiments, plate 116 may be grounded to the negative ground plate for the whole aircraft, also referred to herein as "aircraft ground". In this embodiment, the reference potential may be the negative ground plate for the whole aircraft. In this embodiment, a sensor, such as sensor 128 may monitor a plurality of plates 116 together. For example, plates 116 may be monitored together to determine a global fault. As used herein, a "global fault" is a fault that effects an entire battery module. A global fault may include a fault in a particular battery module 102 of a plurality of battery modules, or at a larger scale, a fault in a battery pack of a plurality of battery packs. As used herein, a "battery pack" is a plurality of battery modules. In other embodiments, plate 116 may be a floating ground, such that the reference potential is the plate 116, itself. As used herein, a "floating ground" is a lack of connection to a ground that is electrically connected to the Earth. In this embodiment, plates 116 may not be directly connected to the aircraft ground. This may allow for plates 116 to be monitored individually to detect a local fault. As used herein, a "local fault" is a fault in a particular portion of a system. A local fault may be a fault in a row of battery cells in a battery module, or at a larger scale, a fault with a battery module within a battery pack. Circuits for a grounded plate 116 and a floating plate are shown in FIGS. 3 and 4. In an embodiment, plate 116 may be connected to a sensor, such as sensor 128, discussed below.

Still referring to FIG. 1, battery module 102 may include a sensor 128, where sensor may be configured to detect a potential signal. As used in this disclosure, a "sensor" is a device that is configured to detect an input and/or a phenomenon and transmit information and/or datum related to the detection, as discussed further below in this disclosure. Output signal may include a potential signal, which transmits information and/or datum related to the sensor detection. A potential signal may include any signal form described in this disclosure, for example digital, analog, optical, electrical, fluidic, and the like. In some cases, a sensor, a circuit, and/or a controller may perform one or more signal processing steps on a signal. For instance, sensor, circuit, and/or controller may analyze, modify, and/or synthesize a signal in order to improve the signal, for instance by improving transmission, storage efficiency, or signal to noise ratio. As used herein a "potential signal" is a signal relating to the voltage measured across the sensor. In one embodiment, sensor 128 may be configured to detect a potential signal in the battery module 102. In one embodiment, the sensor 128 may be configured to detect a potential signal in an adjacent battery module. In another embodiment, sensor 128 may detect a potential signal in a battery cell 104/row of battery cells 104. In some embodiment, sensor 128 may be configured to transmit a potential signal to a controller 132.

Still referring to FIG. 1. In some embodiments, sensor 128 may comprise a plurality of sensors in the form of individual sensors or a sensor suite working in tandem or individually. Sensor 128 may include a plurality of independent sensors, as described herein, where any number of the described sensors may be used to detect any number of physical or electrical quantities associated with an aircraft power apparatus or an electrical energy storage apparatus. Sensor 128 may include a resistance sensor designed and configured to measure the resistance of at least an energy source. Sensor 128 may include separate sensors measuring physical or electrical quantities that may be powered by and/or in communication with circuits independently, where each may signal sensor output to a control circuit such as a user graphical interface. In a non-limiting example, there may be four independent sensors housed in and/or on battery module 102 measuring temperature, electrical characteristic such as voltage, amperage, resistance, or impedance, or any other parameters and/or quantities as described in this disclosure. There may be a sensor 128 located on each row of battery cells 104 within battery module 102. In an embodiment, use of a plurality of independent sensors may result in redundancy configured to employ more than one sensor that measures the same phenomenon, those sensors being of the same type, a combination of, or another type of sensor not disclosed, so that in the event one sensor fails, the ability of a flight controller and/or user to detect phenomenon is maintained and in a non-limiting example, a user alter aircraft usage pursuant to sensor readings.

Additionally, or alternatively, and still referring to FIG. 1, in one embodiment, sensor 128 may include a moisture sensor. "Moisture", as used in this disclosure, is the presence of water, this may include vaporized water in air, condensation on the surfaces of objects, or concentrations of liquid water. Moisture may include humidity. "Humidity", as used in this disclosure, is the property of a gaseous medium (almost always air) to hold water in the form of vapor. An amount of water vapor contained within a parcel of air can vary significantly. Water vapor is generally invisible to the human eye and may be damaging to electrical components. There are three primary measurements of humidity, absolute, relative, specific humidity. "Absolute humidity," for the purposes of this disclosure, describes the water content of air and is expressed in either grams per cubic meters or grams per kilogram. "Relative humidity", for the purposes of this disclosure, is expressed as a percentage, indicating a present stat of absolute humidity relative to a maximum humidity given the same temperature. "Specific humidity", for the purposes of this disclosure, is the ratio of water vapor mass to total moist air parcel mass, where parcel is a given portion of a gaseous medium. Moisture sensor 204 may be psychrometer. Moisture sensor may be a hygrometer. Moisture sensor may be configured to act as or include a humidistat. A "humidistat", for the purposes of this disclosure, is a humidity-triggered switch, often used to control another electronic device. Moisture sensor 204 may use capacitance to measure relative humidity and include in itself, or as an external component, include a device to convert relative humidity measurements to absolute humidity measurements. "Capacitance", for the purposes of this disclosure, is the ability of a system to store an electric charge, in this case the system is a parcel of air which may be near, adjacent to, or above a battery cell.

With continued reference to FIG. 1, sensor 128 may include electrical sensors. Electrical sensors may be configured to measure voltage across a component, electrical current through a component, and resistance of a component. Electrical sensors may include separate sensors to measure each of the previously disclosed electrical characteristics such as voltmeter, ammeter, and ohmmeter, respectively.

Alternatively or additionally, and with continued reference to FIG. 1, sensor 128 may include a sensor or plurality thereof that may detect voltage and direct the charging of individual battery cells according to charge level; detection may be performed using any suitable component, set of components, and/or mechanism for direct or indirect measurement and/or detection of voltage levels, including without limitation comparators, analog to digital converters, any form of voltmeter, or the like. Sensor 128 and/or a control circuit incorporated therein and/or communicatively connected thereto may be configured to adjust charge to one or more battery cells as a function of a charge level and/or a detected parameter. For instance, and without limitation, sensor 128 may be configured to determine that a charge level of a battery cell is high based on a detected voltage level of that battery cell or portion of the battery pack. Sensor 128 may alternatively or additionally detect a charge reduction event, defined for purposes of this disclosure as any temporary or permanent state of a battery cell requiring reduction or cessation of charging; a charge reduction event may include a cell being fully charged and/or a cell undergoing a physical and/or electrical process that makes continued charging at a current voltage and/or current level inadvisable due to a risk that the cell will be damaged, will overheat, or the like. Detection of a charge reduction event may include detection of a temperature, of the cell above a threshold level, detection of a voltage and/or resistance level above or below a threshold, or the like. Sensor 128 may include digital sensors, analog sensors, or a combination thereof. Sensor suite 200 may include digital-to-analog converters (DAC), analog-to-digital converters (ADC, A/D, A-to-D), a combination thereof, or other signal conditioning components used in transmission of a potential signal to a destination over wireless or wired connection.

With continued reference to FIG. 1, sensor 128 may include a multimeter. Multimeter may be configured to measure voltage across a component, electrical current through a component, and resistance of a component. Multimeter may include separate sensors to measure each of the previously disclosed electrical characteristics such as voltmeter, ammeter, and ohmmeter, respectively.

With continued reference to FIG. 1, sensor 128 may include thermocouples, thermistors, thermometers, passive infrared sensors, resistance temperature sensors (RTD's), semiconductor based integrated circuits (IC), a combination thereof or another undisclosed sensor type, alone or in combination. Temperature, for the purposes of this disclosure, and as would be appreciated by someone of ordinary skill in the art, is a measure of the heat energy of a system. Temperature, as measured by any number or sensor 128, may be measured in Fahrenheit (° F.), Celsius (° C.), Kelvin (° K), or another scale alone or in combination. The temperature measured by sensors may comprise electrical signals which are transmitted to their appropriate destination wireless or through a wired connection.

Additionally, or alternatively, sensor 128 may include a sensor configured to detect gas that may be emitted during or after a cell failure. "Cell failure", for the purposes of this disclosure, refers to a malfunction of a battery cell, which may be an electrochemical cell, that renders the cell inoperable for its designed function, namely providing electrical energy to at least a portion of an electric aircraft. Byproducts of cell failure may include gaseous discharge including oxygen, hydrogen, carbon dioxide, methane, carbon monoxide, a combination thereof, or another undisclosed gas, alone or in combination. Further the sensor configured to detect vent gas from electrochemical cells may comprise a gas detector. For the purposes of this disclosure, a "gas detector" is a device used to detect a gas is present in an area. Gas detectors, and more specifically, the gas sensor, may be configured to detect combustible, flammable, toxic, oxygen depleted, a combination thereof, or another type of gas alone or in combination. The gas sensor may include a combustible gas, photoionization detectors, electrochemical gas sensors, ultrasonic sensors, metal-oxide-semiconductor (MOS) sensors, infrared imaging sensors, a combination thereof, or another undisclosed type of gas sensor alone or in combination. Sensor 128 may include sensors that are configured to detect non-gaseous byproducts of cell failure including, in non-limiting examples, liquid chemical leaks including aqueous alkaline solution, ionomer, molten phosphoric acid, liquid electrolytes with redox shuttle and ionomer, and salt water, among others. Sensor may include sensors that are configured to detect non-gaseous byproducts of cell failure including, in non-limiting examples, electrical anomalies as detected by any of the previous disclosed sensors or components.

With continued reference to FIG. 1, sensor 128 may be configured determine a fault when the potential (also referred to as "voltage") is outside an acceptable potential range. An upper potential threshold may be stored in a data storage system for comparison with an instant measurement taken by sensor 128. The upper potential threshold may be calculated and calibrated based on factors relating to baseline potential, battery cell health, maintenance history, location within battery pack/battery module, designed application, and type, among others. Sensor 128 may measure voltage at an instant, over a period of time, or periodically. Sensor 128 may be configured to operate at any of these detection modes, switch between modes, or simultaneous measure in more than one mode. Sensor 128 may detect events where potential nears the lower potential threshold. The lower potential threshold may indicate power loss to or from an individual battery cell or portion of the battery pack. Sensor 128 may detect events where voltage exceeds the upper and lower potential threshold. Events where voltage exceeds the upper and lower potential threshold may indicate a fault or electrical anomalies that could lead to potentially dangerous situations for aircraft and personnel that may be present in or near its operation. A fault may indicate a breakdown of the insulation 112, wherein the potential of the plate 116 may be affected by the potential of the battery cell 104.

Still referring to FIG. 1. In embodiments, the battery module 102 may include mounting pins 120. In some embodiments, the battery module 102 may include mounting channels 124, where each mounting channel 124 is configured to attach to a mounting pin 120. In a nonlimiting example, the mounting pin and the mounting channel are attached as to completely enclose the battery module. In an embodiment, the pin and mounting channel may also include a locking mechanism.

Still referring to FIG. 1, apparatus 100 may include a controller 132. Controller 132 may be communicatively connected to sensor 128. As used in this disclosure, "communicatively connected" means connected by way of a connection, attachment or linkage between two or more relata which allows for reception and/or transmittance of information therebetween. For example, and without limitation, this connection may be wired or wireless, direct or indirect, and between two or more components, circuits, devices, systems, and the like, which allows for reception and/or transmittance of data and/or signal(s) therebetween. Data and/or signals therebetween may include, without limitation, electrical, electromagnetic, magnetic, video, audio, radio and microwave data and/or signals, combinations thereof, and the like, among others. A communicative connection may be achieved, for example and without limitation, through wired or wireless electronic, digital or analog, communication, either directly or by way of one or more intervening devices or components. Further, communicative connection may include electrically coupling or connecting at least an output of one device, component, or circuit to at least an input of another device, component, or circuit. For example, and without limitation, via a bus or other facility for intercommunication between elements of a computing device. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure.

Controller 132 may include any computing device as described in this disclosure, including without limitation a microcontroller, microprocessor, digital signal processor (DSP) and/or system on a chip (SoC) as described in this disclosure. Computing device may include, be included in, and/or communicate with a mobile device such as a mobile telephone or smartphone. Controller 132 may include a single computing device operating independently, or may include two or more computing device operating in concert, in parallel, sequentially or the like; two or more computing devices may be included together in a single computing device or in two or more computing devices. Controller 132 may interface or communicate with one or more additional devices as described below in further detail via a network interface device. Network interface device may be utilized for connecting controller 132 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Controller 132 may include but is not limited to, for example, a computing device or cluster of computing devices in a first location and a second computing device or cluster of computing devices in a second location. Controller 132 may include one or more computing devices dedicated to data storage, security, distribution of traffic for load balancing, and the like. Controller 132 may distribute one or more computing tasks as described below across a plurality of computing devices of computing device, which may operate in parallel, in series, redundantly, or in any other manner used for distribution of tasks or memory between computing devices. Controller 132 may be implemented using a "shared nothing" architecture in which data is cached at the worker, in an embodiment, this may enable scalability of apparatus 100 and/or computing device.

With continued reference to FIG. 1, controller 132 may be designed and/or configured to perform any method, method step, or sequence of method steps in any embodiment described in this disclosure, in any order and with any degree of repetition. For instance, controller 132 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Controller 132 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Still referencing FIG. 1, controller 132 may be configured to receive a potential signal from the sensor 128. As used in this disclosure, a "signal" is any intelligible representation of data, for example from one device to another. A signal may include an optical signal, a hydraulic signal, a pneumatic signal, a mechanical, signal, an electric signal, a digital signal, an analog signal and the like. In some cases, a signal may be used to communicate with a computing device, for example by way of one or more ports. In some cases, a signal may be transmitted and/or received by a computing device for example by way of an input/output port. An analog signal may be digitized, for example by way of an analog to digital converter. In some cases, an analog signal may be processed, for example by way of any analog signal processing steps described in this disclosure, prior to digitization. In some cases, a digital signal may be used to communicate between two or more devices, including without limitation computing devices. In some cases, a digital signal may be communicated by way of one or more communication protocols, including without limitation internet protocol (IP), controller area network (CAN) protocols, serial communication protocols (e.g., universal asynchronous receiver-transmitter [UART]), parallel communication protocols (e.g., IEEE 128 [printer port]), and the like.

Still referring to FIG. 1, in some cases, apparatus 100 may perform one or more signal processing steps on a signal. For instance, apparatus 100 may analyze, modify, and/or synthesize a signal representative of data in order to improve the signal, for instance by improving transmission, storage efficiency, or signal to noise ratio. Exemplary methods of signal processing may include analog, continuous time, discrete, digital, nonlinear, and statistical. Analog signal processing may be performed on non-digitized or analog signals. Exemplary analog processes may include passive filters, active filters, additive mixers, integrators, delay lines, compandors, multipliers, voltage-controlled filters, voltage-controlled oscillators, and phase-locked loops. Continuous-time signal processing may be used, in some cases, to process signals which varying continuously within a domain, for instance time. Exemplary non-limiting continuous time processes may include time domain processing, frequency domain processing (Fourier transform), and complex frequency domain processing. Discrete time signal processing may be used when a signal is sampled non-continuously or at discrete time intervals (i.e., quantized in time). Analog discrete-time signal processing may process a signal using the following exemplary circuits sample and hold circuits, analog time-division multiplexers, analog delay lines and analog feedback shift registers. Digital signal processing may be used to process digitized discrete-time sampled signals. Commonly, digital signal processing may be performed by a computing device or other specialized digital circuits, such as without limitation an application specific integrated circuit (ASIC), a field-programmable gate array (FPGA), or a specialized digital signal processor (DSP). Digital signal processing may be used to perform any combination of typical arithmetical operations, including fixed-point and floating-point, real-valued and complex-valued, multiplication and addition. Digital signal processing may additionally operate circular buffers and lookup tables. Further non-limiting examples of algorithms that may be performed according to digital signal processing techniques include fast Fourier transform (FFT), finite impulse response (FIR) filter, infinite impulse response (IIR) filter, and adaptive filters such as the Wiener and Kalman filters. Statistical signal processing may be used to process a signal as a random function (i.e., a stochastic process), utilizing statistical properties. For instance, in some embodiments, a signal may be modeled with a probability distribution indicating noise, which then may be used to reduce noise in a processed signal.

Still referencing FIG. 1, controller 132 may be configured to determine a fault as a function of the potential signal. As used herein, a "fault" is an issue with a component. For example, a fault in battery module 102 may be a short in a circuit. A fault may be a ground fault. As used herein a "ground fault" is a fault wherein the positive or negative path in a circuit is shorted with the ground. In another example, a fault may indicate a breakdown of the insulation 112 between the battery cells 104 and the plate 116. A fault may be determined when the potential measured by sensor 128 is outside of an acceptable potential range. For example, in a 127 volt apparatus, the positive end may read 72 volts and the negative end may read 55 volts. If sensor 128 detects a voltage of 0V at the positive end and a voltage of 127V at the negative end, there is a fault in the apparatus. In an embodiment, controller 132 may determine a local fault of a battery module 102, such as a fault in a particular battery cell 104. This may occur when plate 116 is a floating ground and the components of battery module 102 are electronically isolated. In a floating ground scenario, plates 116 are monitored individually. Additionally, or alternatively, controller 132 may determine a global fault of a battery module 102, such as a fault in a particular battery module 102. This may occur when plate 116 is connected to the aircraft ground. A controller 132 may determine a global fault and/or a local fault by monitoring sensor 128 for changes in potential between the plate 116 and the reference potential (which may be the aircraft ground and/or the plate 116). For example, a global fault may be determined when sensor 128 does not read −12V for a 12V battery apparatus.

Continuing to reference FIG. 1, determining a fault may be used to prevent thermal runaway. Thermal runaway may occur when battery cells 104 and/or battery module 102 enters an uncontrollable, self-heating state. This may occur due to faults in the battery cells 104 and/or battery modules 102 because of short circuits and/or an overloaded circuit, and/or the like. Thermal runaway may also be caused by small faults that do not trip any fuses, such as in a case wherein the insulation 112 between the cooling tube and the battery cells 104 breaks down, causing a short circuit that is low in severity where fuses are not blown.

Figure 7:
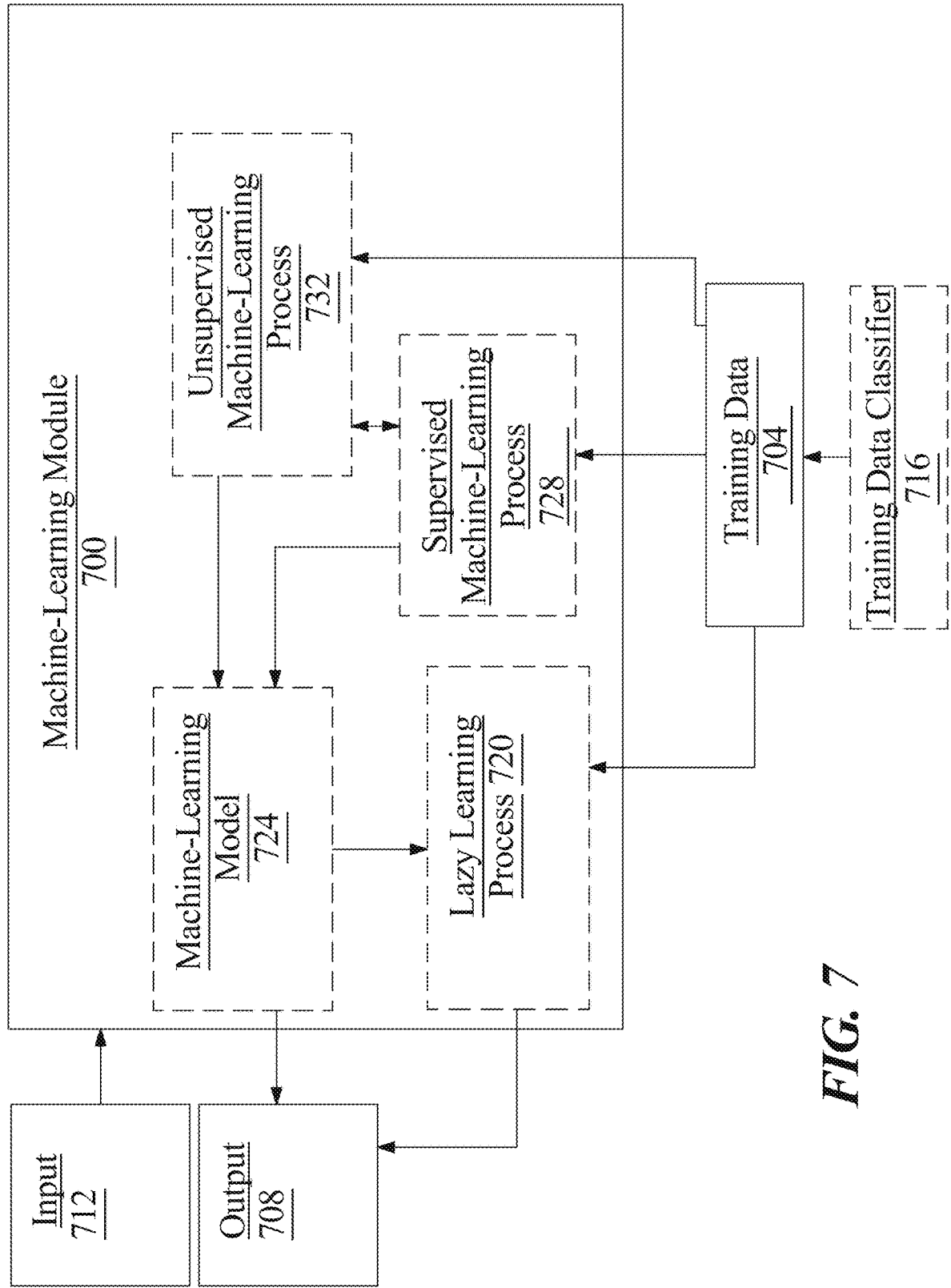
FIG. 7 is an exemplary embodiment of a machine learning module.

Still referencing FIG. 1, controller 132 may determine an acceptable voltage threshold using a machine-learning model, such as those discussed in FIG. 7. In an embodiment, machine-learning model may be trained with training data including previous voltages and whether there was a fault at that given voltage. Training data may be received from a training data database, such as a database maintained by an aircraft operator or battery manufacturing company. Using the training data, machine-learning model may output an acceptable voltage threshold wherein a fault should not have occurred. Machine-learning model may be iterative such that training data may include multiple sets of training that that may result from previous versions of the machine-learning model. Each output of machine-learning model may be used as training data for future iterations of the machine-learning model.

Figure 2A:
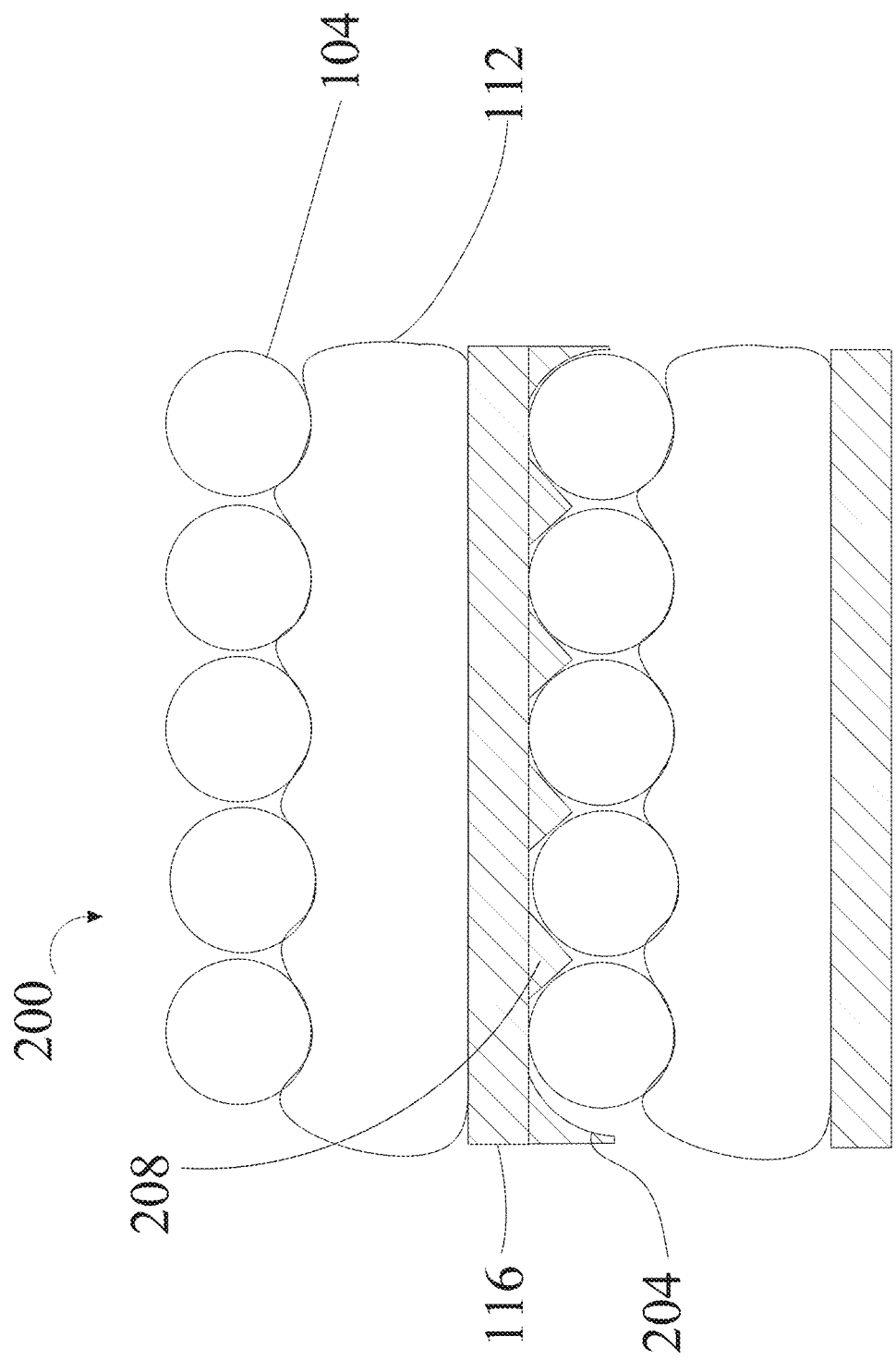
FIG. 2A is an exemplary embodiment of a section of plates disposed between rows of battery cells and insulations.

Now referring to FIG. 2A, an exemplary view of a section 200 of the plates 116 disposed between rows of battery cells 104 and insulation 112 is illustrated. In one embodiment, the plates may include angled edges 204, where the angled edges 204 may be configured to face towards the same direction. In one embodiment, the angled edges may be further configured to wrap around a portion of a battery cell 104. In one embodiment, the plates 116 may include wedges 208, where the wedges 208 are configured to restrain movement of the battery cells 104.

Figure 2B:
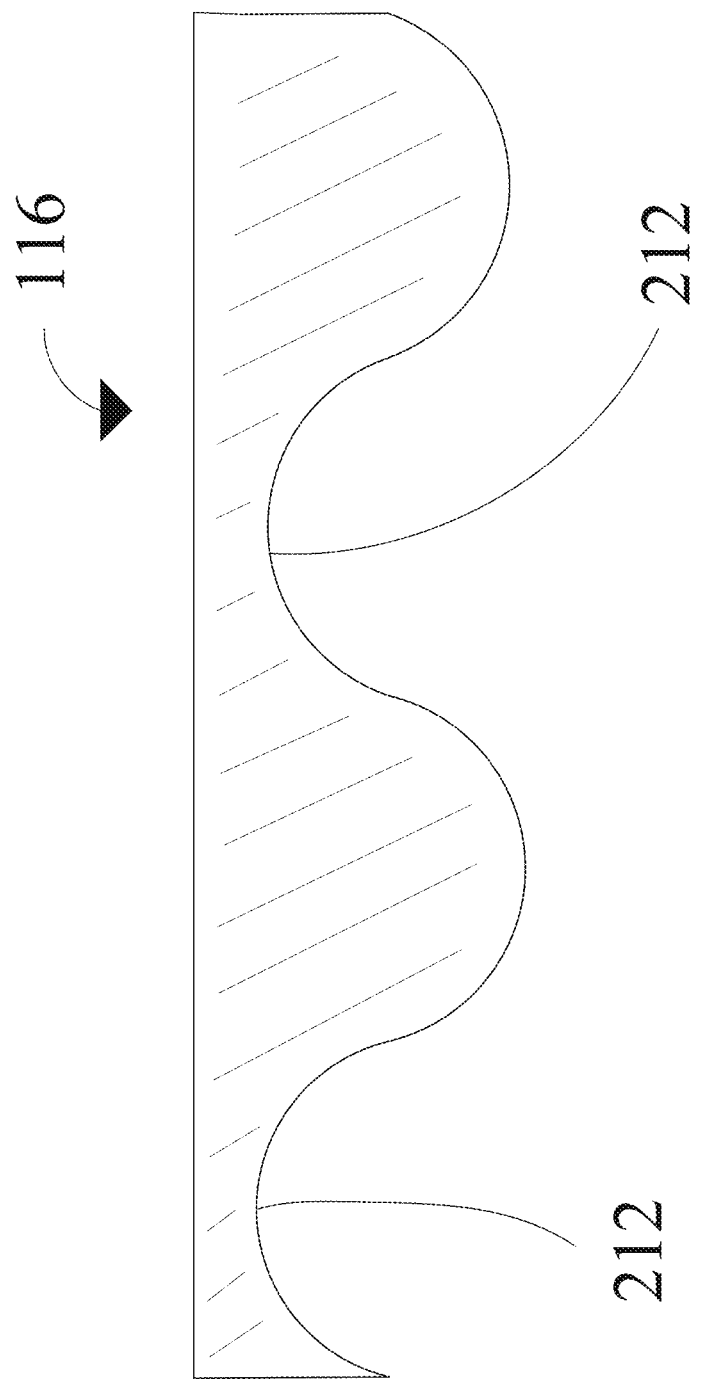
FIG. 2B is an exemplary embodiment of a section of a plate.

Referring now to FIG. 2B, an exemplary section 200 of a plate 116 is illustrated. In one embodiment, the plate 116 includes curves 212 that are configured to wrap around a portion of the battery cells 104. In a nonlimiting example, the plate has a waving shape on the side of the battery cells, where the circular shape keeps the cells from moving.

Now referring to FIG. 3, a schematic of a fault detection apparatus 300 with floating ground is shown. In a floating ground embodiment, reference potential may be the plate 116. Sensor 128 may monitor the potential between the battery cells 104 and the plate 116. Insulation 112 may be located between the battery cells 104 and the plate 116. If there is a breakdown in insulation 112, sensor 128 may detect a change in potential which may be greater than or less than a potential threshold as the plate 116 may be affected by the potential of the battery cell 104. Additionally, a short in the apparatus, which is a fault, may be detected as a result of a breakdown in insulation 112 and the like.

Now referring to FIG. 4, a schematic of a fault detection apparatus 400 with a plate grounded to the aircraft ground. In this grounded embodiment, plates 116 may be electrically communicative, wherein the communication allows each plate to be monitored together to detect a global fault. As used herein, "electrically communicative" means a connection such that electricity can be transferred over the connection. FIG. 3 shows one plate 116 connected to an aircraft ground, however there may be a plurality of plates 116 connected to the same aircraft ground. Sensor 128 may monitor the potential between the plates 116 and the aircraft ground 404. Aircraft ground 404 may be the reference potential in this embodiment. Sensor 128 may detect a change in potential which may be greater than or less than a potential threshold. This may be a result of insulation breakdown and/or a short in apparatus 400.

Figure 5:
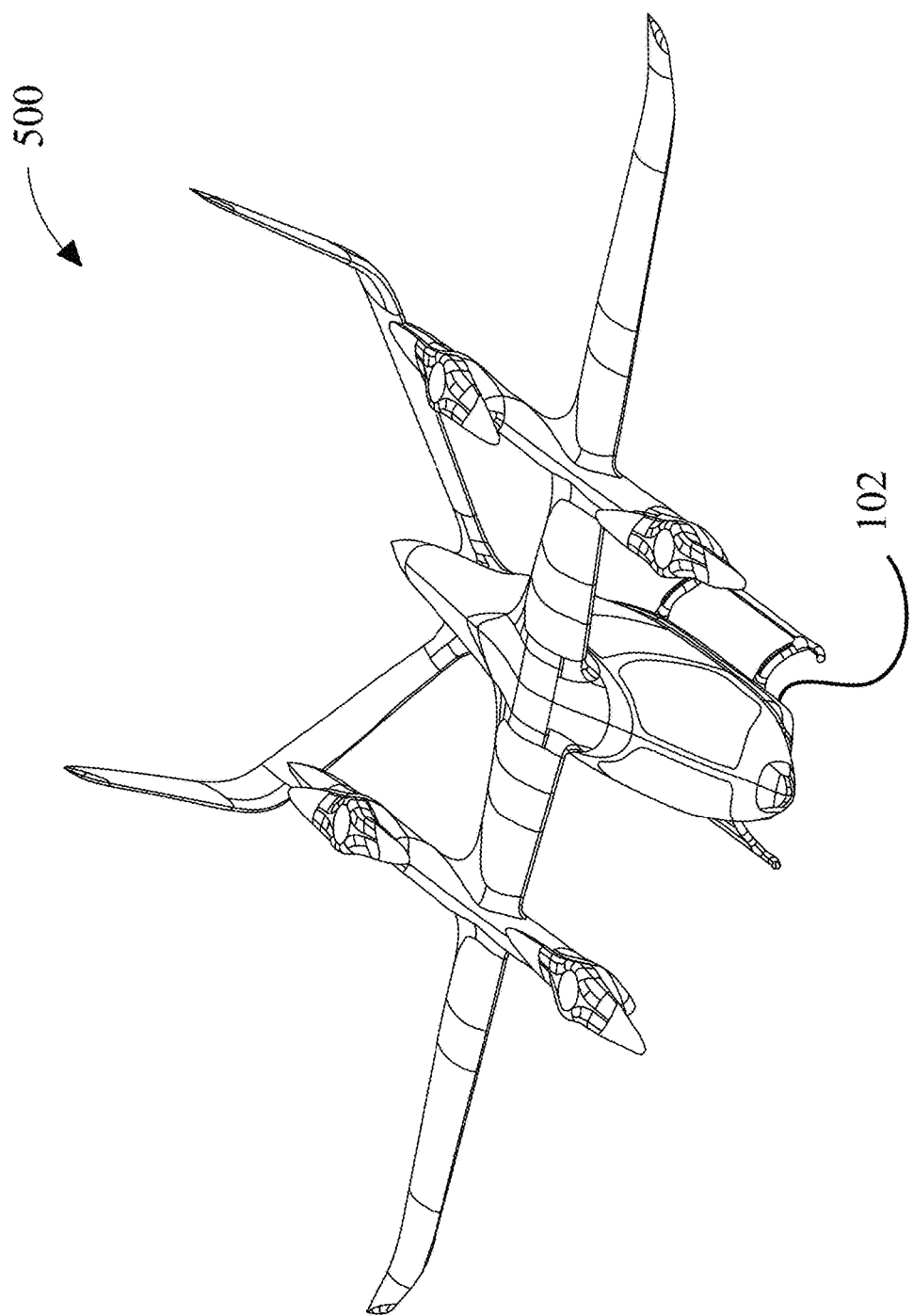
FIG. 5 is a box diagram of an exemplary embodiment of an electric aircraft.

Referring now to FIG. 5, an embodiment of an electric aircraft 500 is presented. In one embodiment, the electric aircraft is powered by a plurality of battery modules 102. In some embodiments, the electric aircraft 500 may include a vertical takeoff and landing aircraft (eVTOL). As used herein, a vertical take-off and landing (eVTOL) aircraft is one that can hover, take off, and land vertically. An eVTOL, as used herein, is an electrically powered aircraft typically using an energy source, of a plurality of energy sources to power the aircraft. To optimize the power and energy necessary to propel the aircraft, the eVTOL may be capable of rotor-based cruising flight, rotor-based takeoff, rotor-based landing, fixed-wing cruising flight, airplane-style takeoff, airplane-style landing, and/or any combination thereof. Rotor-based flight, as described herein, is where the aircraft generated lift and propulsion by way of one or more powered rotors coupled with an engine, such as a "quad copter," multi-rotor helicopter, or other vehicle that maintains its lift primarily using downward thrusting propulsors. Fixed-wing flight, as described herein, is where the aircraft is capable of flight using wings and/or foils that generate life caused by the aircraft's forward airspeed and the shape of the wings and/or foils, such as airplane-style flight.

With continued reference to FIG. 5, a number of aerodynamic forces may act upon the electric aircraft 500 during flight. Forces acting on an electric aircraft 500 during flight may include, without limitation, thrust, the forward force produced by the rotating element of the electric aircraft 500 and acts parallel to the longitudinal axis. Another force acting upon electric aircraft 500 may be, without limitation, drag, which may be defined as a rearward retarding force which is caused by disruption of airflow by any protruding surface of the electric aircraft 500 such as, without limitation, the wing, rotor, and fuselage. Drag may oppose thrust and acts rearward parallel to the relative wind. A further force acting upon electric aircraft 500 may include, without limitation, weight, which may include a combined load of the electric aircraft 500 itself, crew, baggage, and/or fuel. Weight may pull electric aircraft 500 downward due to the force of gravity. An additional force acting on electric aircraft 500 may include, without limitation, lift, which may act to oppose the downward force of weight and may be produced by the dynamic effect of air acting on the airfoil and/or downward thrust from the propulsor of the electric aircraft. Lift generated by the airfoil may depend on speed of airflow, density of air, total area of an airfoil and/or segment thereof, and/or an angle of attack between air and the airfoil. For example, and without limitation, electric aircraft 500 are designed to be as lightweight as possible. Reducing the weight of the aircraft and designing to reduce the number of components is essential to optimize the weight. To save energy, it may be useful to reduce weight of components of an electric aircraft 500, including without limitation propulsors and/or propulsion assemblies. In an embodiment, the motor may eliminate need for many external structural features that otherwise might be needed to join one component to another component. The motor may also increase energy efficiency by enabling a lower physical propulsor profile, reducing drag and/or wind resistance. This may also increase durability by lessening the extent to which drag and/or wind resistance add to forces acting on electric aircraft 500 and/or propulsors.

Figure 6:
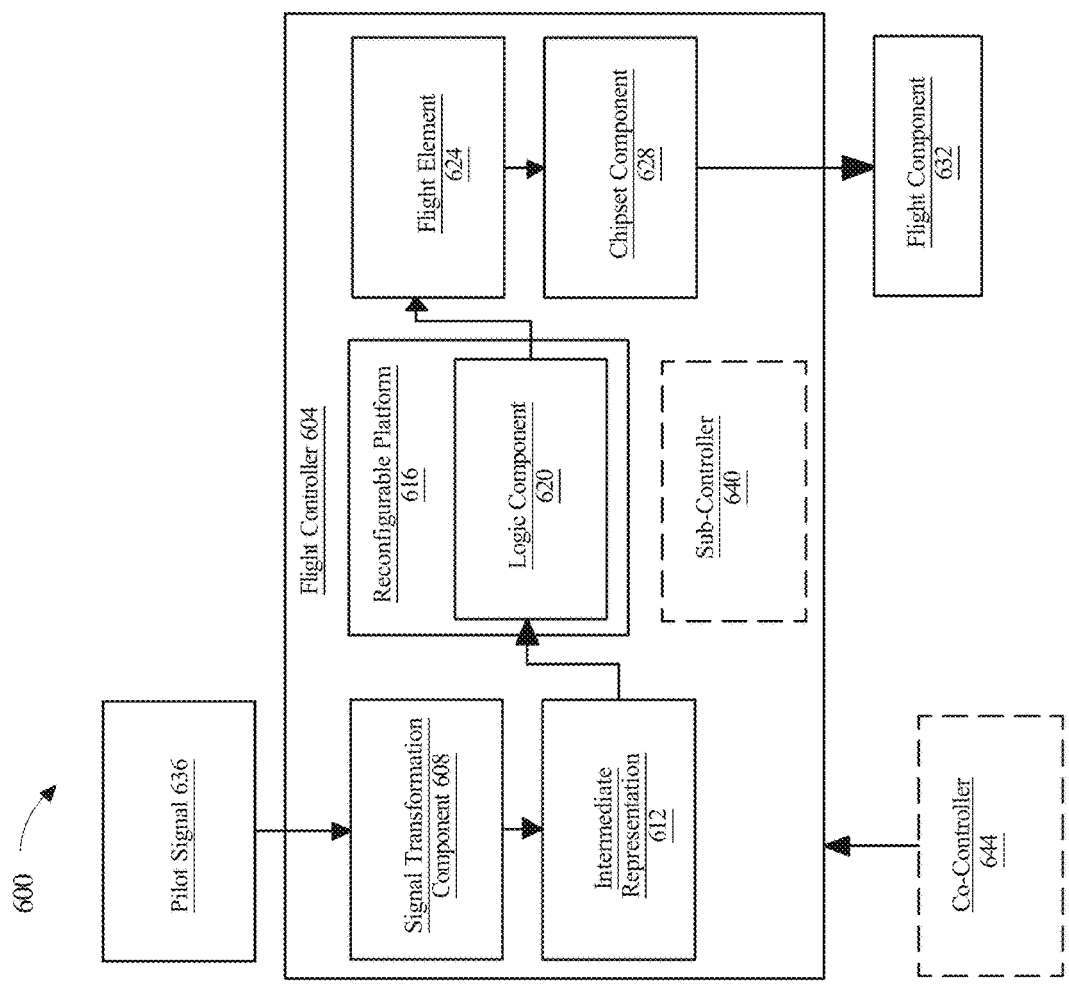
FIG. 6 is a box diagram of an exemplary embodiment of a flight controller.

Now referring to FIG. 6, an exemplary embodiment 600 of a flight controller 604 is illustrated. As used in this disclosure a "flight controller" is a computing device of a plurality of computing devices dedicated to data storage, security, distribution of traffic for load balancing, and flight instruction. Flight controller 604 may include and/or communicate with any computing device as described in this disclosure, including without limitation a microcontroller, microprocessor, digital signal processor (DSP) and/or apparatus on a chip (SoC) as described in this disclosure. Further, flight controller 604 may include a single computing device operating independently, or may include two or more computing device operating in concert, in parallel, sequentially or the like; two or more computing devices may be included together in a single computing device or in two or more computing devices. In embodiments, flight controller 604 may be installed in an aircraft, may control the aircraft remotely, and/or may include an element installed in the aircraft and a remote element in communication therewith.

In an embodiment, and still referring to FIG. 6, flight controller 604 may include a signal transformation component 608. As used in this disclosure a "signal transformation component" is a component that transforms and/or converts a first signal to a second signal, wherein a signal may include one or more digital and/or analog signals. For example, and without limitation, signal transformation component 608 may be configured to perform one or more operations such as preprocessing, lexical analysis, parsing, semantic analysis, and the like thereof. In an embodiment, and without limitation, signal transformation component 608 may include one or more analog-to-digital convertors that transform a first signal of an analog signal to a second signal of a digital signal. For example, and without limitation, an analog-to-digital converter may convert an analog input signal to a 10-bit binary digital representation of that signal.

In another embodiment, signal transformation component 608 may include transforming one or more low-level languages such as, but not limited to, machine languages and/or assembly languages. For example, and without limitation, signal transformation component 608 may include transforming a binary language signal to an assembly language signal. In an embodiment, and without limitation, signal transformation component 608 may include transforming one or more high-level languages and/or formal languages such as but not limited to alphabets, strings, and/or languages. For example, and without limitation, high-level languages may include one or more apparatus languages, scripting languages, domain-specific languages, visual languages, esoteric languages, and the like thereof. As a further non-limiting example, high-level languages may include one or more algebraic formula languages, business data languages, string and list languages, object-oriented languages, and the like thereof.

Still referring to FIG. 6, signal transformation component 608 may be configured to optimize an intermediate representation 612. As used in this disclosure an "intermediate representation" is a data structure and/or code that represents the input signal. Signal transformation component 608 may optimize intermediate representation as a function of a data-flow analysis, dependence analysis, alias analysis, pointer analysis, escape analysis, and the like thereof. In an embodiment, and without limitation, signal transformation component 608 may optimize intermediate representation 612 as a function of one or more inline expansions, dead code eliminations, constant propagation, loop transformations, and/or automatic parallelization functions. In another embodiment, signal transformation component 608 may optimize intermediate representation as a function of a machine dependent optimization such as a peephole optimization, wherein a peephole optimization may rewrite short sequences of code into more efficient sequences of code. Signal transformation component 608 may optimize intermediate representation to generate an output language, wherein an "output language," as used herein, is the native machine language of flight controller 604. For example, and without limitation, native machine language may include one or more binary and/or numerical languages.

In an embodiment, and without limitation, signal transformation component 608 may include transform one or more inputs and outputs as a function of an error correction code. An error correction code, also known as error correcting code (ECC), is an encoding of a message or lot of data using redundant information, permitting recovery of corrupted data. An ECC may include a block code, in which information is encoded on fixed-size packets and/or blocks of data elements such as symbols of predetermined size, bits, or the like. Reed-Solomon coding, in which message symbols within a symbol set having q symbols are encoded as coefficients of a polynomial of degree less than or equal to a natural number k, over a finite field F with q elements; strings so encoded have a minimum hamming distance of k+1, and permit correction of (q−k−1)/2 erroneous symbols. Block code may alternatively or additionally be implemented using Golay coding, also known as binary Golay coding, Bose-Chaudhuri, Hocquenghuem (BCH) coding, multidimensional parity-check coding, and/or Hamming codes. An ECC may alternatively or additionally be based on a convolutional code.

In an embodiment, and still referring to FIG. 6, flight controller 604 may include a reconfigurable hardware platform 616. A "reconfigurable hardware platform," as used herein, is a component and/or unit of hardware that may be reprogrammed, such that, for instance, a data path between elements such as logic gates or other digital circuit elements may be modified to change an algorithm, state, logical sequence, or the like of the component and/or unit. This may be accomplished with such flexible high-speed computing fabrics as field-programmable gate arrays (FPGAs), which may include a grid of interconnected logic gates, connections between which may be severed and/or restored to program in modified logic.

Still referring to FIG. 6, reconfigurable hardware platform 616 may include a logic component 620. As used in this disclosure a "logic component" is a component that executes instructions on output language. For example, and without limitation, logic component may perform basic arithmetic, logic, controlling, input/output operations, and the like thereof. Logic component 620 may include any suitable processor, such as without limitation a component incorporating logical circuitry for performing arithmetic and logical operations, such as an arithmetic and logic unit (ALU), which may be regulated with a state machine and directed by operational inputs from memory and/or sensors; logic component 620 may be organized according to Von Neumann and/or Harvard architecture as a non-limiting example. Logic component 620 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or apparatus on a chip (SoC). In an embodiment, logic component 620 may include one or more integrated circuit microprocessors, which may contain one or more central processing units, central processors, and/or main processors, on a single metal-oxide-semiconductor chip. Logic component 620 may be configured to execute a sequence of stored instructions to be performed on the output language and/or intermediate representation 612. Logic component 620 may be configured to fetch and/or retrieve the instruction from a memory cache, wherein a "memory cache," as used in this disclosure, is a stored instruction set on flight controller 604. Logic component 620 may be configured to decode the instruction retrieved from the memory cache to opcodes and/or operands. Logic component 620 may be configured to execute the instruction on intermediate representation 612 and/or output language. For example, and without limitation, logic component 620 may be configured to execute an addition operation on intermediate representation 612 and/or output language.

In an embodiment, and without limitation, logic component 620 may be configured to calculate a flight element 624. As used in this disclosure a "flight element" is an element of datum denoting a relative status of aircraft. For example, and without limitation, flight element 624 may denote one or more torques, thrusts, airspeed velocities, forces, altitudes, groundspeed velocities, directions during flight, directions facing, forces, orientations, and the like thereof. For example, and without limitation, flight element 624 may denote that aircraft is cruising at an altitude and/or with a sufficient magnitude of forward thrust. As a further non-limiting example, flight status may denote that is building thrust and/or groundspeed velocity in preparation for a takeoff. As a further non-limiting example, flight element 624 may denote that aircraft is following a flight path accurately and/or sufficiently.

Still referring to FIG. 6, flight controller 604 may include a chipset component 628. As used in this disclosure a "chipset component" is a component that manages data flow. In an embodiment, and without limitation, chipset component 628 may include a northbridge data flow path, wherein the northbridge dataflow path may manage data flow from logic component 620 to a high-speed device and/or component, such as a RAM, graphics controller, and the like thereof. In another embodiment, and without limitation, chipset component 628 may include a southbridge data flow path, wherein the southbridge dataflow path may manage data flow from logic component 620 to lower-speed peripheral buses, such as a peripheral component interconnect (PCI), industry standard architecture (ICA), and the like thereof. In an embodiment, and without limitation, southbridge data flow path may include managing data flow between peripheral connections such as ethernet, USB, audio devices, and the like thereof. Additionally or alternatively, chipset component 628 may manage data flow between logic component 620, memory cache, and a flight component 632. As used in this disclosure a "flight component" is a portion of an aircraft that can be moved or adjusted to affect one or more flight elements. For example, flight component 632 may include a component used to affect the aircrafts' roll and pitch which may comprise one or more ailerons. As a further example, flight component 632 may include a rudder to control yaw of an aircraft. In an embodiment, chipset component 628 may be configured to communicate with a plurality of flight components as a function of flight element 624. For example, and without limitation, chipset component 628 may transmit to an aircraft rotor to reduce torque of a first lift propulsor and increase the forward thrust produced by a pusher component to perform a flight maneuver.

Still referring to FIG. 6, flight controller 604 may include, be included in, and/or communicate with a mobile device such as a mobile telephone or smartphone. Further, flight controller may communicate with one or more additional devices as described below in further detail via a network interface device. The network interface device may be utilized for commutatively connecting a flight controller to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. The network may include any network topology and can may employ a wired and/or a wireless mode of communication.

In an embodiment, and still referring to FIG. 6, flight controller 604 may include, but is not limited to, for example, a cluster of flight controllers in a first location and a second flight controller or cluster of flight controllers in a second location. Flight controller 604 may include one or more flight controllers dedicated to data storage, security, distribution of traffic for load balancing, and the like. Flight controller 604 may be configured to distribute one or more computing tasks as described below across a plurality of flight controllers, which may operate in parallel, in series, redundantly, or in any other manner used for distribution of tasks or memory between computing devices. For example, and without limitation, flight controller 604 may implement a control algorithm to distribute and/or command the plurality of flight controllers. As used in this disclosure a "control algorithm" is a finite sequence of well-defined computer implementable instructions that may determine the flight component of the plurality of flight components to be adjusted. For example, and without limitation, control algorithm may include one or more algorithms that reduce and/or prevent aviation asymmetry. As a further non-limiting example, control algorithms may include one or more models generated as a function of a software including, but not limited to Simulink by MathWorks, Natick, Mass., USA. In an embodiment, and without limitation, control algorithm may be configured to generate an auto-code, wherein an "auto-code," is used herein, is a code and/or algorithm that is generated as a function of the one or more models and/or software's. In another embodiment, control algorithm may be configured to produce a segmented control algorithm. As used in this disclosure a "segmented control algorithm" is control algorithm that has been separated and/or parsed into discrete sections. For example, and without limitation, segmented control algorithm may parse control algorithm into two or more segments, wherein each segment of control algorithm may be performed by one or more flight controllers operating on distinct flight components.

In an embodiment, and still referring to FIG. 6, control algorithm may be configured to determine a segmentation boundary as a function of segmented control algorithm. As used in this disclosure a "segmentation boundary" is a limit and/or delineation associated with the segments of the segmented control algorithm. For example, and without limitation, segmentation boundary may denote that a segment in the control algorithm has a first starting section and/or a first ending section. As a further non-limiting example, segmentation boundary may include one or more boundaries associated with an ability of flight component 632. In an embodiment, control algorithm may be configured to create an optimized signal communication as a function of segmentation boundary. For example, and without limitation, optimized signal communication may include identifying the discrete timing required to transmit and/or receive the one or more segmentation boundaries. In an embodiment, and without limitation, creating optimized signal communication further comprises separating a plurality of signal codes across the plurality of flight controllers. For example, and without limitation the plurality of flight controllers may include one or more formal networks, wherein formal networks transmit data along an authority chain and/or are limited to task-related communications. As a further non-limiting example, communication network may include informal networks, wherein informal networks transmit data in any direction. In an embodiment, and without limitation, the plurality of flight controllers may include a chain path, wherein a "chain path," as used herein, is a linear communication path comprising a hierarchy that data may flow through. In an embodiment, and without limitation, the plurality of flight controllers may include an all-channel path, wherein an "all-channel path," as used herein, is a communication path that is not restricted to a particular direction. For example, and without limitation, data may be transmitted upward, downward, laterally, and the like thereof. In an embodiment, and without limitation, the plurality of flight controllers may include one or more neural networks that assign a weighted value to a transmitted datum. For example, and without limitation, a weighted value may be assigned as a function of one or more signals denoting that a flight component is malfunctioning and/or in a failure state.

Still referring to FIG. 6, the plurality of flight controllers may include a master bus controller. As used in this disclosure a "master bus controller" is one or more devices and/or components that are connected to a bus to initiate a direct memory access transaction, wherein a bus is one or more terminals in a bus architecture. Master bus controller may communicate using synchronous and/or asynchronous bus control protocols. In an embodiment, master bus controller may include flight controller 604. In another embodiment, master bus controller may include one or more universal asynchronous receiver-transmitters (UART). For example, and without limitation, master bus controller may include one or more bus architectures that allow a bus to initiate a direct memory access transaction from one or more buses in the bus architectures. As a further non-limiting example, master bus controller may include one or more peripheral devices and/or components to communicate with another peripheral device and/or component and/or the master bus controller. In an embodiment, master bus controller may be configured to perform bus arbitration. As used in this disclosure "bus arbitration" is method and/or scheme to prevent multiple buses from attempting to communicate with and/or connect to master bus controller. For example and without limitation, bus arbitration may include one or more schemes such as a small computer interface system, wherein a small computer interface system is a set of standards for physical connecting and transferring data between peripheral devices and master bus controller by defining commands, protocols, electrical, optical, and/or logical interfaces. In an embodiment, master bus controller may receive intermediate representation 612 and/or output language from logic component 620, wherein output language may include one or more analog-to-digital conversions, low bit rate transmissions, message encryptions, digital signals, binary signals, logic signals, analog signals, and the like thereof described above in detail.

Still referring to FIG. 6, master bus controller may communicate with a slave bus. As used in this disclosure a "slave bus" is one or more peripheral devices and/or components that initiate a bus transfer. For example, and without limitation, slave bus may receive one or more controls and/or asymmetric communications from master bus controller, wherein slave bus transfers data stored to master bus controller. In an embodiment, and without limitation, slave bus may include one or more internal buses, such as but not limited to a/an internal data bus, memory bus, system bus, front-side bus, and the like thereof. In another embodiment, and without limitation, slave bus may include one or more external buses such as external flight controllers, external computers, remote devices, printers, aircraft computer systems, flight control systems, and the like thereof.

In an embodiment, and still referring to FIG. 6, control algorithm may optimize signal communication as a function of determining one or more discrete timings. For example, and without limitation master bus controller may synchronize timing of the segmented control algorithm by injecting high priority timing signals on a bus of the master bus control. As used in this disclosure a "high priority timing signal" is information denoting that the information is important. For example, and without limitation, high priority timing signal may denote that a section of control algorithm is of high priority and should be analyzed and/or transmitted prior to any other sections being analyzed and/or transmitted. In an embodiment, high priority timing signal may include one or more priority packets. As used in this disclosure a "priority packet" is a formatted unit of data that is communicated between the plurality of flight controllers. For example, and without limitation, priority packet may denote that a section of control algorithm should be used and/or is of greater priority than other sections.

Still referring to FIG. 6, flight controller 604 may also be implemented using a "shared nothing" architecture in which data is cached at the worker, in an embodiment, this may enable scalability of aircraft and/or computing device. Flight controller 604 may include a distributer flight controller. As used in this disclosure a "distributer flight controller" is a component that adjusts and/or controls a plurality of flight components as a function of a plurality of flight controllers. For example, distributer flight controller may include a flight controller that communicates with a plurality of additional flight controllers and/or clusters of flight controllers.

Still referring to FIG. 6, flight controller may include a sub-controller 640. As used in this disclosure a "sub-controller" is a controller and/or component that is part of a distributed controller as described above; for instance, flight controller 604 may be and/or include a distributed flight controller made up of one or more sub-controllers. For example, and without limitation, sub-controller 640 may include any controllers and/or components thereof that are similar to distributed flight controller and/or flight controller as described above. Sub-controller 640 may include any component of any flight controller as described above. Sub-controller 640 may be implemented in any manner suitable for implementation of a flight controller as described above. As a further non-limiting example, sub-controller 640 may include one or more processors, logic components and/or computing devices capable of receiving, processing, and/or transmitting data across the distributed flight controller as described above. As a further non-limiting example, sub-controller 640 may include a controller that receives a signal from a first flight controller and/or first distributed flight controller component and transmits the signal to a plurality of additional sub-controllers and/or flight components.

Still referring to FIG. 6, flight controller may include a co-controller 644. As used in this disclosure a "co-controller" is a controller and/or component that joins flight controller 604 as components and/or nodes of a distributer flight controller as described above. For example, and without limitation, co-controller 644 may include one or more controllers and/or components that are similar to flight controller 604. As a further non-limiting example, co-controller 644 may include any controller and/or component that joins flight controller 604 to distributer flight controller. As a further non-limiting example, co-controller 644 may include one or more processors, logic components and/or computing devices capable of receiving, processing, and/or transmitting data to and/or from flight controller 604 to distributed flight control system. Co-controller 644 may include any component of any flight controller as described above. Co-controller 644 may be implemented in any manner suitable for implementation of a flight controller as described above.

In an embodiment, and with continued reference to FIG. 6, flight controller 604 may be designed and/or configured to perform any method, method step, or sequence of method steps in any embodiment described in this disclosure, in any order and with any degree of repetition. For instance, flight controller 604 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Flight controller may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Referring now to FIG. 7, an exemplary embodiment of a machine-learning module 700 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 704 to generate an algorithm that will be performed by a computing device/module to produce outputs 708 given data provided as inputs 712; this is in contrast to a non-machine learning software program where the commands to be executed are determined in advance by a user and written in a programming language.

Still referring to FIG. 7, "training data," as used herein, is data containing correlations that a machine-learning process may use to model relationships between two or more categories of data elements. For instance, and without limitation, training data 704 may include a plurality of data entries, each entry representing a set of data elements that were recorded, received, and/or generated together; data elements may be correlated by shared existence in a given data entry, by proximity in a given data entry, or the like. Multiple data entries in training data 704 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 704 according to various correlations; correlations may indicate causative and/or predictive links between categories of data elements, which may be modeled as relationships such as mathematical relationships by machine-learning processes as described in further detail below. Training data 704 may be formatted and/or organized by categories of data elements, for instance by associating data elements with one or more descriptors corresponding to categories of data elements. As a non-limiting example, training data 704 may include data entered in standardized forms by persons or processes, such that entry of a given data element in a given field in a form may be mapped to one or more descriptors of categories. Elements in training data 704 may be linked to descriptors of categories by tags, tokens, or other data elements; for instance, and without limitation, training data 704 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 7, training data 704 may include one or more elements that are not categorized; that is, training data 704 may not be formatted or contain descriptors for some elements of data. Machine-learning algorithms and/or other processes may sort training data 704 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 704 to be made applicable for two or more distinct machine-learning algorithms as described in further detail below. Training data 704 used by machine-learning module 700 may correlate any input data as described in this disclosure to any output data as described in this disclosure. As a non-limiting illustrative example an input to a machine-learning model may include a voltage, and an output may include a voltage threshold.

Further referring to FIG. 7, training data may be filtered, sorted, and/or selected using one or more supervised and/or unsupervised machine-learning processes and/or models as described in further detail below; such models may include without limitation a training data classifier 716. Training data classifier 716 may include a "classifier," which as used in this disclosure is a machine-learning model as defined below, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Machine-learning module 700 may generate a classifier using a classification algorithm, defined as a processes whereby a computing device and/or any module and/or component operating thereon derives a classifier from training data 704. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers.

Still referring to FIG. 7, machine-learning module 700 may be configured to perform a lazy-learning process 720 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 704. Heuristic may include selecting some number of highest-ranking associations and/or training data 704 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 7, machine-learning processes as described in this disclosure may be used to generate machine-learning models 724. A "machine-learning model," as used in this disclosure, is a mathematical and/or algorithmic representation of a relationship between inputs and outputs, as generated using any machine-learning process including without limitation any process as described above, and stored in memory; an input is submitted to a machine-learning model 724 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 724 may be generated by creating an artificial neural network, such as a convolutional neural network comprising an input layer of nodes, one or more intermediate layers, and an output layer of nodes. Connections between nodes may be created via the process of "training" the network, in which elements from a training data 704 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 7, machine-learning algorithms may include at least a supervised machine-learning process 728. At least a supervised machine-learning process 728, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include inputs as described above as inputs, outputs as described above as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 704. Persons skilled in the art, upon reviewing the entirety of this disclosure, will be aware of various possible variations of at least a supervised machine-learning process 728 that may be used to determine relation between inputs and outputs. Supervised machine-learning processes may include classification algorithms as defined above.

Further referring to FIG. 7, machine learning processes may include at least an unsupervised machine-learning processes 732. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 7, machine-learning module 700 may be designed and configured to create a machine-learning model 724 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 7, machine-learning algorithms may include, without limitation, linear discriminant analysis. Machine-learning algorithm may include quadratic discriminant analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized trees, AdaBoost, gradient tree boosting, and/or voting classifier methods. Machine-learning algorithms may include neural net algorithms, including convolutional neural net processes.

Figure 8:
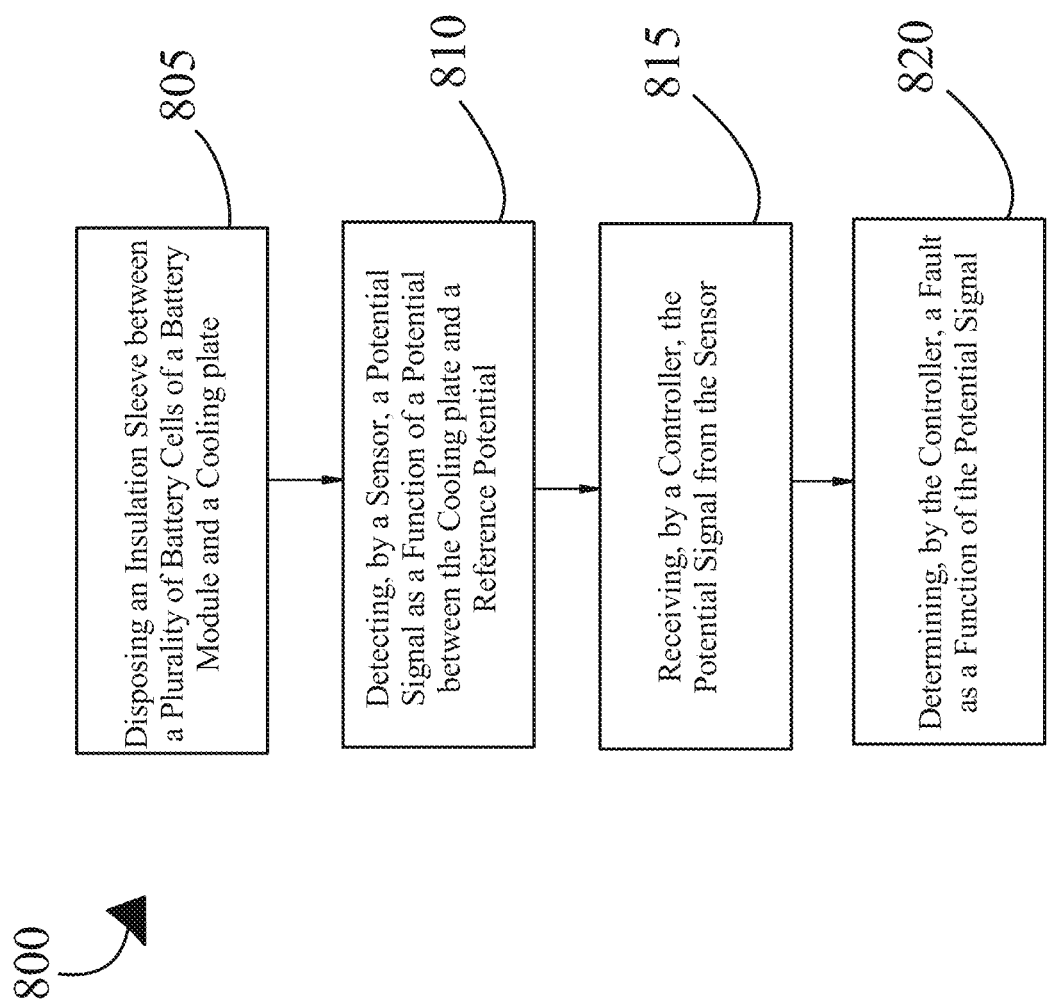
FIG. 8 is a flow chart of an exemplary embodiment of a method for fault detection in a battery module.

Now referring to FIG. 8, a method 800 for fault detection in a battery module is shown. Step 805 of method 800 includes disposing insulation between a plurality of battery cells of a battery module and a plate, wherein the insulation is configured to electrically insulate the plate from the plurality of battery cells. There may be a plurality of compression pads placed between each battery cell of the plurality of battery cells. Plate may include a heat pipe, coolant pipe, and the like. Plate may be grounded to the reference potential. In the case where the reference potential is the plate, the plate may act as a floating ground. This step may be implemented without limitation as described in FIGS. 1-7.

Step 810 of method 800 includes detecting, by a sensor, a potential signal as a function of a potential between the plate and a reference potential. Step 815 of method 800 includes receiving, by a controller, the potential signal from the sensor. These steps may be implemented without limitation as described in FIGS. 1-7.

Step 820 of method 800 includes determining, by the controller, a fault as a function of the potential signal. Determining a fault further includes determining a fault as a function of an acceptable potential range. Controller may determine a local fault and/or a global fault as a function of the potential signal. The fault may indicate a breakdown of the insulation. This step may be implemented without limitation as described in FIGS. 1-7.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 9:
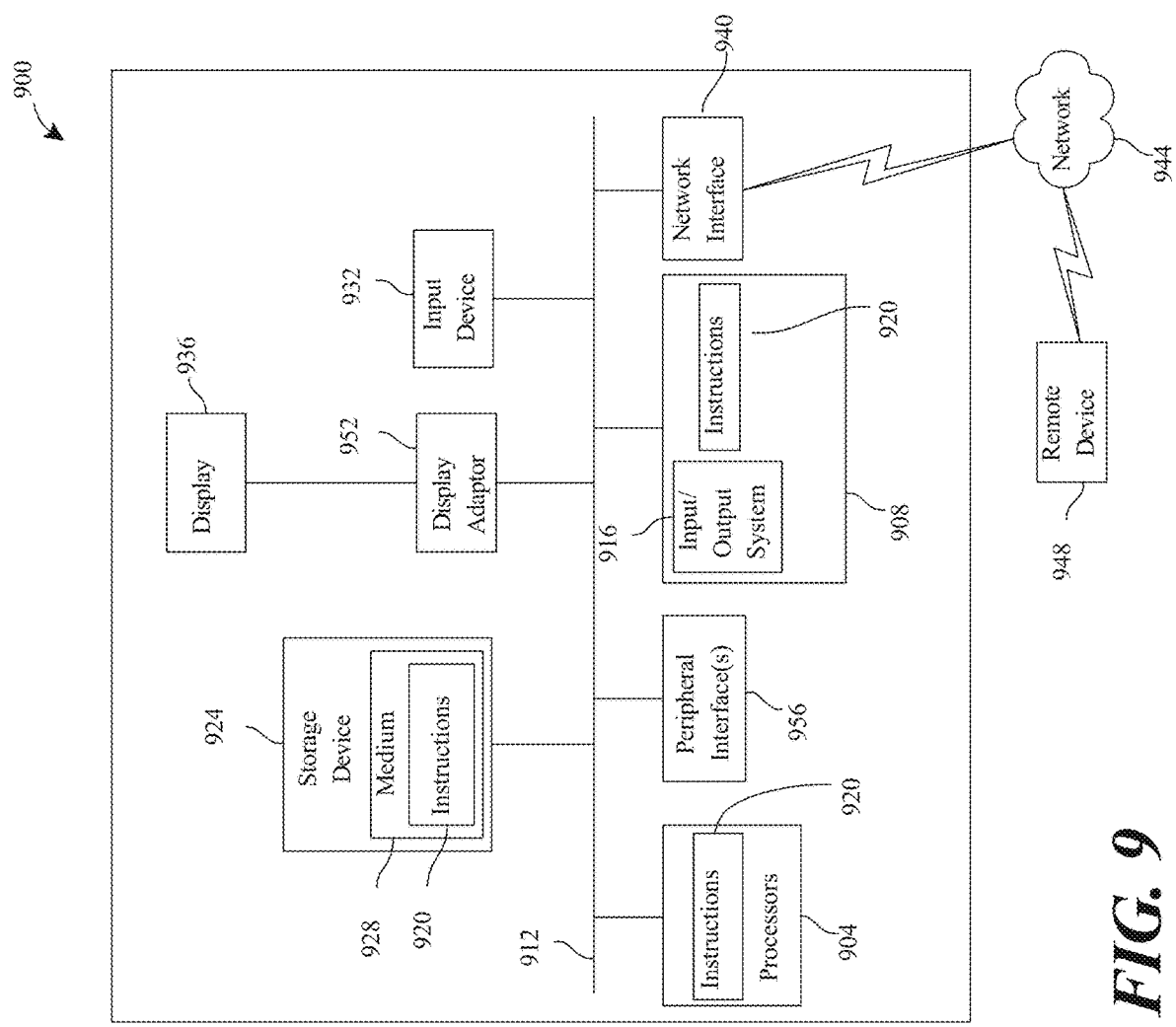
FIG. 9 is a diagrammatic representation of one embodiment of a computing device.

FIG. 9 shows a diagrammatic representation of one embodiment of a computing device in the exemplary form of a computer system 900 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 900 includes a processor 904 and a memory 908 that communicate with each other, and with other components, via a bus 912. Bus 912 may include any of several types of bus structures including, but not limited to, a memory bus, a memory controller, a peripheral bus, a local bus, and any combinations thereof, using any of a variety of bus architectures.

Memory 908 may include various components (e.g., machine-readable media) including, but not limited to, a random-access memory component, a read only component, and any combinations thereof. In one example, a basic input/output system 916 (BIOS), including basic routines that help to transfer information between elements within computer system 900, such as during start-up, may be stored in memory 908. Memory 908 may also include (e.g., stored on one or more machine-readable media) instructions (e.g., software) 920 embodying any one or more of the aspects and/or methodologies of the present disclosure. In another example, memory 908 may further include any number of program modules including, but not limited to, an operating system, one or more application programs, other program modules, program data, and any combinations thereof.

Computer system 900 may also include a storage device 924. Examples of a storage device (e.g., storage device 924) include, but are not limited to, a hard disk drive, a magnetic disk drive, an optical disc drive in combination with an optical medium, a solid-state memory device, and any combinations thereof. Storage device 924 may be connected to bus 912 by an appropriate interface (not shown). Example interfaces include, but are not limited to, SCSI, advanced technology attachment (ATA), serial ATA, universal serial bus (USB), IEEE 994 (FIREWIRE), and any combinations thereof. In one example, storage device 924 (or one or more components thereof) may be removably interfaced with computer system 900 (e.g., via an external port connector (not shown)). Particularly, storage device 924 and an associated machine-readable medium 928 may provide nonvolatile and/or volatile storage of machine-readable instructions, data structures, program modules, and/or other data for computer system 900. In one example, software 920 may reside, completely or partially, within machine-readable medium 928. In another example, software 920 may reside, completely or partially, within processor 904.

Computer system 900 may also include an input device 932. In one example, a user of computer system 900 may enter commands and/or other information into computer system 900 via input device 932. Examples of an input device 932 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 932 may be interfaced to bus 912 via any of a variety of interfaces (not shown) including, but not limited to, a serial interface, a parallel interface, a game port, a USB interface, a FIREWIRE interface, a direct interface to bus 912, and any combinations thereof. Input device 932 may include a touch screen interface that may be a part of or separate from display 936, discussed further below. Input device 932 may be utilized as a user selection device for selecting one or more graphical representations in a graphical interface as described above.

A user may also input commands and/or other information to computer system 900 via storage device 924 (e.g., a removable disk drive, a flash drive, etc.) and/or network interface device 940. A network interface device, such as network interface device 940, may be utilized for connecting computer system 900 to one or more of a variety of networks, such as network 944, and one or more remote devices 948 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 944, may employ a wired and/or a wireless mode of communication. In general, any network topology may be used. Information (e.g., data, software 920, etc.) may be communicated to and/or from computer system 900 via network interface device 940.

Computer system 900 may further include a video display adapter 952 for communicating a displayable image to a display device, such as display device 936. Examples of a display device include, but are not limited to, a liquid crystal display (LCD), a cathode ray tube (CRT), a plasma display, a light emitting diode (LED) display, and any combinations thereof. Display adapter 952 and display device 936 may be utilized in combination with processor 904 to provide graphical representations of aspects of the present disclosure. In addition to a display device, computer system. 900 may include one or more other peripheral output devices including, but not limited to, an audio speaker, a printer, and any combinations thereof. Such peripheral output devices may be connected to bus 912 via a peripheral interface 956. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve embodiments according to this disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An apparatus for fault detection in a battery module, the apparatus comprising:
    a battery module comprising a plurality of battery cells;
    a plate extending along a first row of the plurality of battery cells, wherein the plate has a first side and a second side opposed to the first side, wherein the first side comprises a flat surface extending along the first row and the second side comprises a contoured surface with peaks and valleys;
    an insulation disposed between the first row of the plurality of battery cells and the plate, wherein the insulation is configured to electrically insulate the plate from the plurality of battery cells, wherein:
        the flat surface of the plate contacts the insulation; and
        the contoured surface of the plate contacts a second row of the plurality of battery cells spaced from the first row of the plurality of battery cells by the plate and the insulation;
    a sensor configured to detect a potential signal as a function of a potential between the plate and a reference potential; and
    a controller communicatively connected to the sensor, wherein the controller configured to:
        receive the potential signal from the sensor; and
        determine a fault as a function of the potential signal.

2. The apparatus of claim 1, wherein the plate comprises a cooling plate.

3. The apparatus of claim 2, wherein the cooling plate comprises a heat pipe.

4. The apparatus of claim 2, wherein the cooling plate comprises a coolant tube.

5. The apparatus of claim 1, wherein the plate is grounded to the reference potential.

6. The apparatus of claim 1, wherein the plate is a floating ground.

7. The apparatus of claim 1, wherein determining the fault further comprises determining the fault as a function of an acceptable potential range.

8. The apparatus of claim 1, wherein the controller is further configured to determine a local fault as a function of the potential signal.

9. The apparatus of claim 1, wherein the controller is further configured to determine a global fault as a function of the potential signal.

10. The apparatus of claim 1, wherein determining the fault comprises determining a short circuit.

11. A method of fault detection in a battery module, the method comprising:
    disposing an insulation between a first row of a plurality of battery cells of a battery module and a plate, wherein the insulation is configured to electrically insulate the plate from the plurality of battery cells, wherein:
        the plate has a first side and a second side opposed to the first side;
        the first side comprises a flat surface extending along the first row and the second side comprises a contoured surface with peaks and valleys;
        the flat surface of the plate contacts the insulation; and
        the contoured surface of the plate contacts a second row of the plurality of battery cells spaced from the first row of the plurality of battery cells by the plate and the insulation;
    detecting, by a sensor, a potential signal as a function of a potential between the plate and a reference potential;
    receiving, by a controller, the potential signal from the sensor; and
    determining, by the controller, a fault as a function of the potential signal.

12. The method of claim 11, wherein the plate comprises a cooling plate.

13. The method of claim 12, wherein the cooling plate comprises a heat pipe.

14. The method of claim 12, wherein the cooling plate comprises a coolant tube.

15. The method of claim 11, wherein the plate is grounded to the reference potential.

16. The method of claim 11, wherein the plate is a floating ground.

17. The method of claim 11, wherein determining the fault further comprises determining the fault as a function of an acceptable potential range.

18. The method of claim 11, further comprising determining, by the controller, a local fault as a function of the potential signal.

19. The method of claim 11, further comprising determining, by the controller, a global fault as a function of the potential signal.

20. The method of claim 11, wherein determining the fault comprises determining a short circuit.

\* \* \* \* \*